W. M. BRADSHAW.
ELECTRICAL MEASURING INSTRUMENT.
APPLICATION FILED MAR. 8, 1917.
1,318,723.
Patented Oct. 14, 1919.
4 SHEETS—SHEET 3.
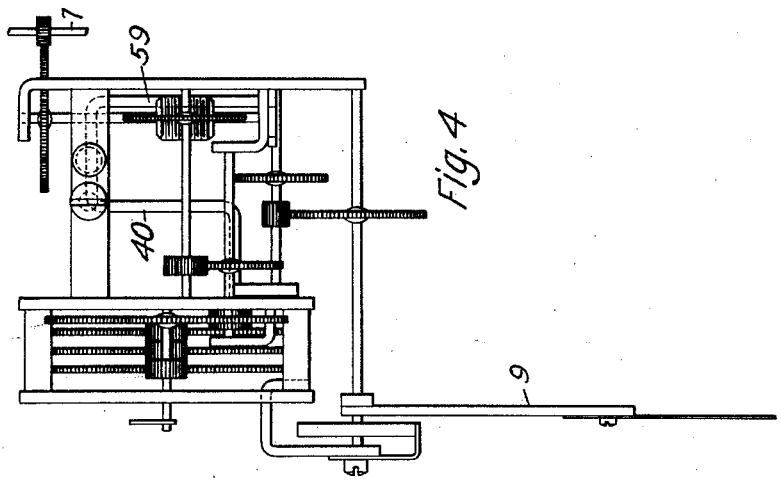
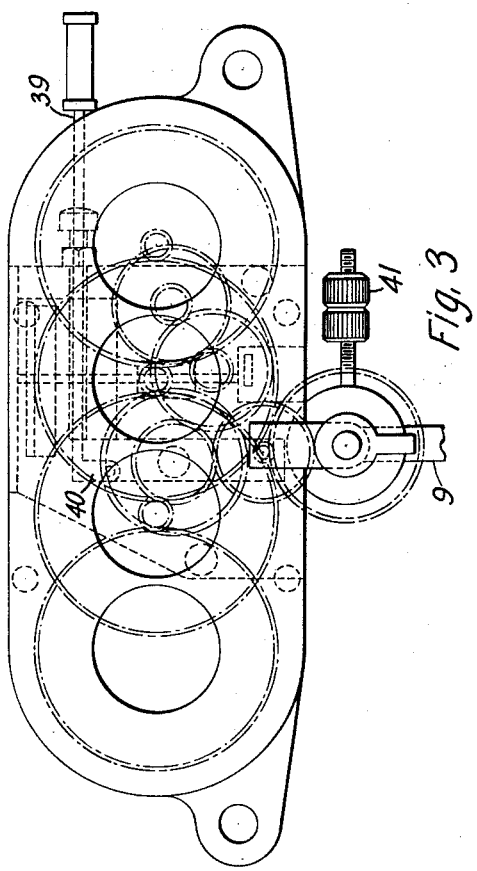
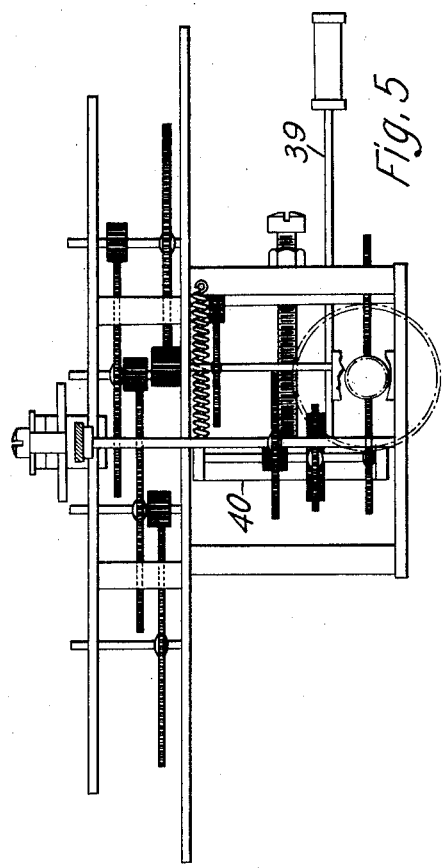
WITNESSES:
Fred. C. Wilharm
J. H. Procter
INVENTOR
William M. Bradshaw
BY
Wesley G. Carr
ATTORNEY

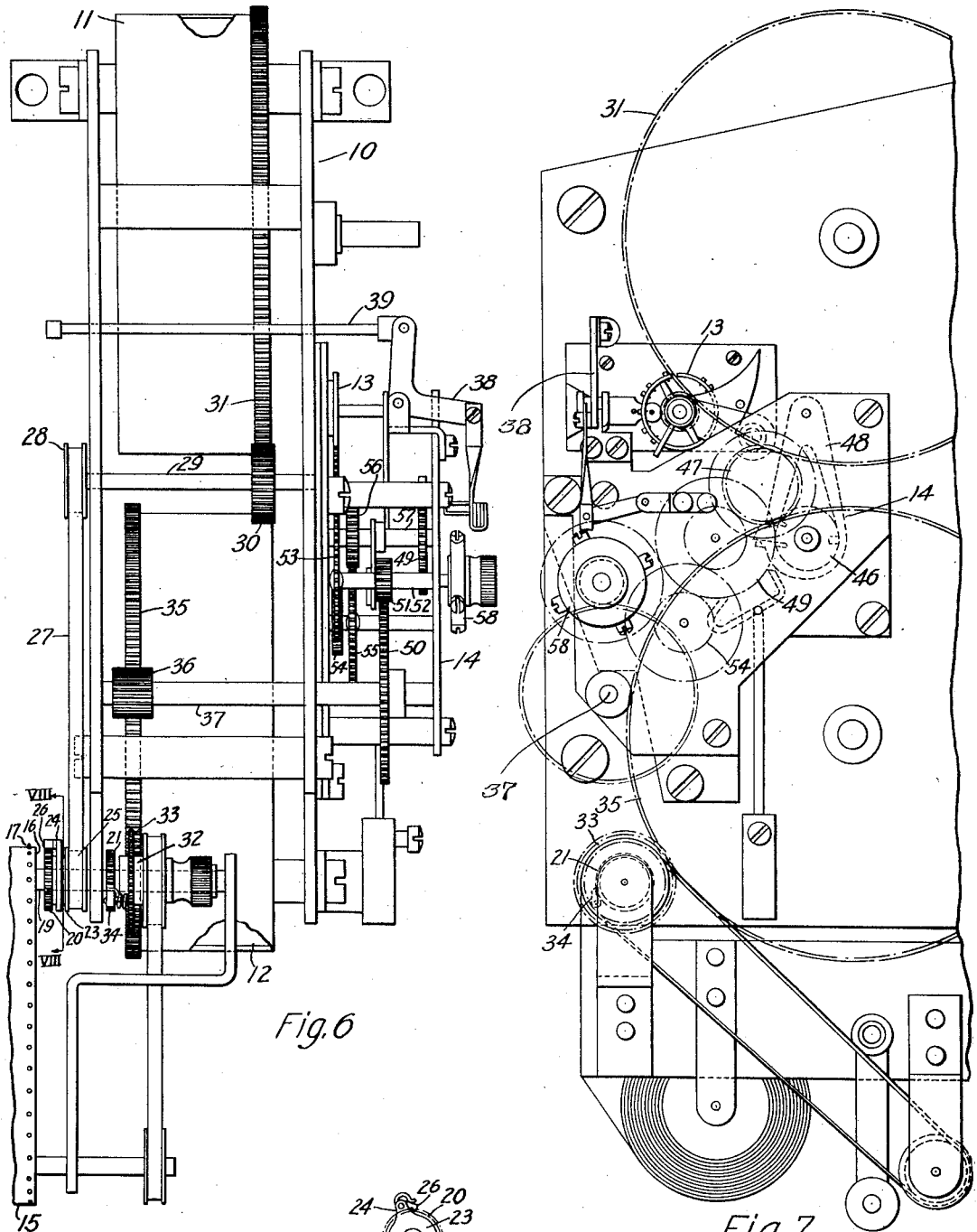

UNITED STATES PATENT OFFICE.

WILLIAM M. BRADSHAW, OF WILKINSBURG, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

1,318,723.      Specification of Letters Patent.      Patented Oct. 14, 1919.

Application filed March 8, 1917. Serial No. 153,301.

*To all whom it may concern:*

Be it known that I, WILLIAM M. BRADSHAW, a citizen of the United States, and a resident of Wilkinsburg, in the county of Allegheny and State of Pennsylvania, have invented a new and useful Improvement in Electrical Measuring Instruments, of which the following is a specification.

My invention relates to electrical measuring instruments and particularly to meters by means of which periodic demands for power are recorded.

The object of my invention is to provide a compact and inexpensive meter of the above indicated character by means of which the periodic demands for power are graphically recorded upon a record sheet that is continuously advanced and periodically advanced a predetermined interval of time before each resetting of the recording stylus, thereby providing records having flat tops that are separated from each other.

Heretofore, graphic-demand meters have been provided that produced a record having a substantially flat top but such records were difficult to read because they were superposed, in part, upon one another. In view of the above, I provide a measuring instrument, a record sheet, a marking device actuated directly by the measuring instrument, a clock for continuously advancing the record sheet and means controlled by the clock for periodically advancing the record sheet and for so disconnecting the marking device from the measuring instrument, after each periodic advance of the record sheet, that it is permitted to be reset to its initial position. With such a device, records are produced having substantially flat tops, but the sides of one figure or record of which are not parallel or concentric with the sides of the other records.

Figure 1:
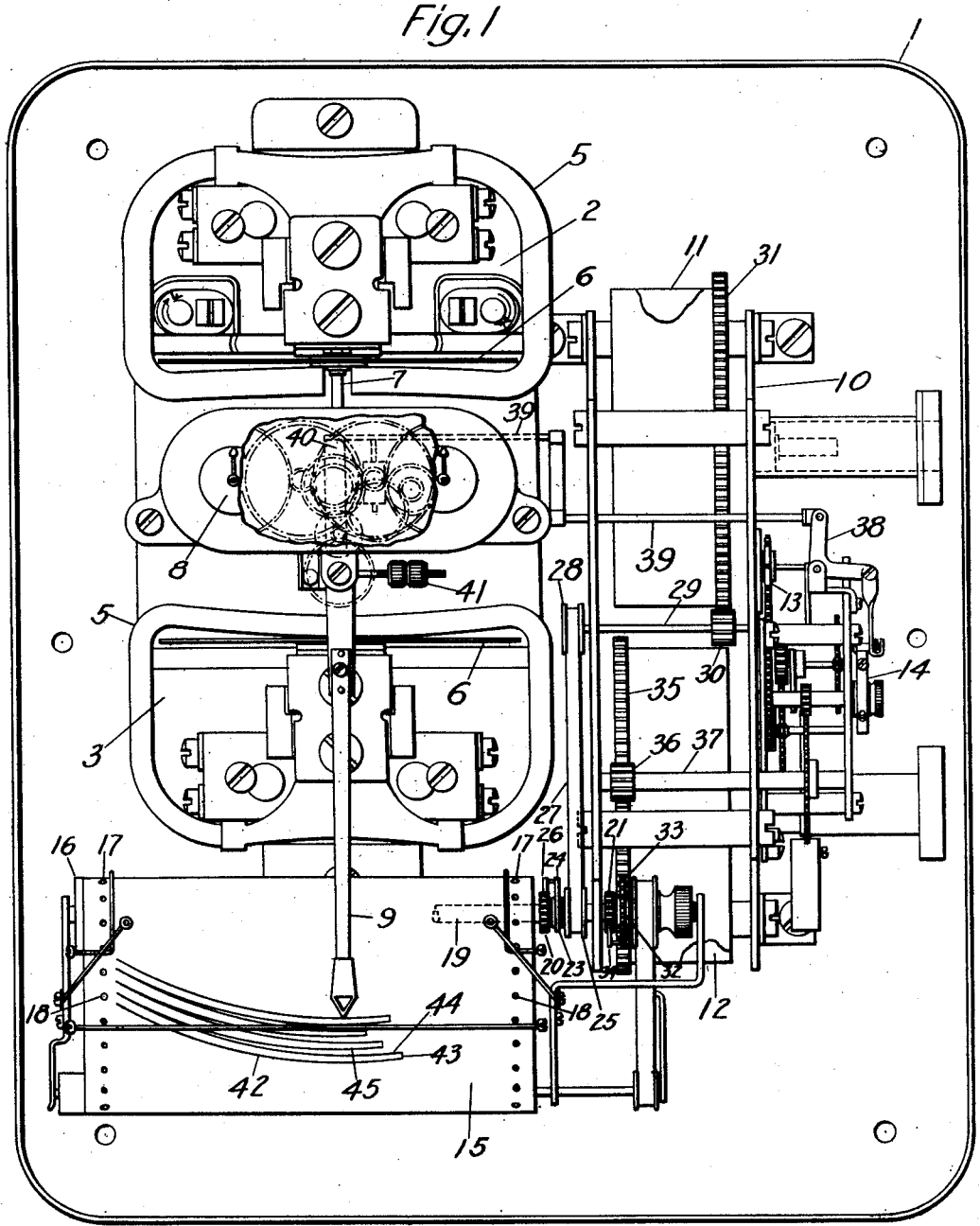
Figure 2:
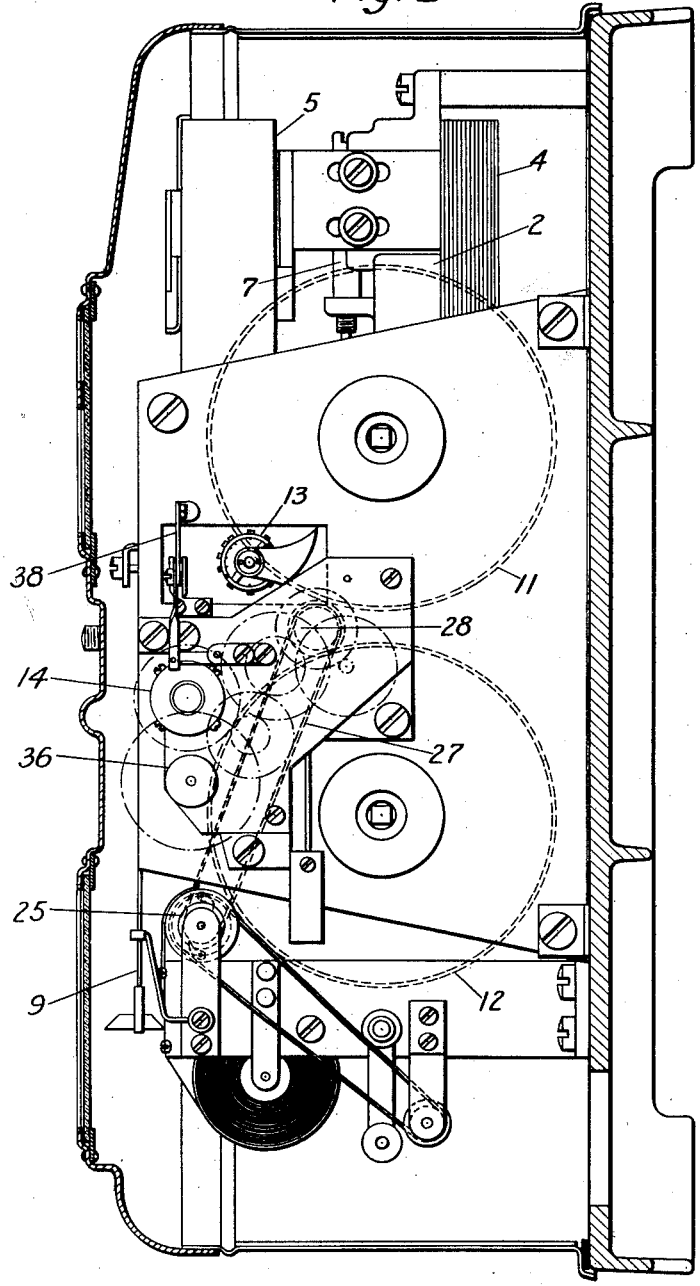

In the accompanying drawings, Figure 1 is a front elevational view, with parts broken away, of a measuring instrument embodying my invention; Fig. 2 is a side view, partially in elevation and partially in section, of the measuring instrument shown in Fig. 1; Figs. 3, 4 and 5 are front elevational, side elevational and top plan views, respectively, of the integrating and disconnecting mechanism embodying my invention; Figs. 6 and 7 are front and side elevational views, respectively, of the clock mechanism embodying my invention, and Fig. 8 is a view taken along the line VIII—VIII of Fig. 6.

In a casing 1 are mounted two electrical measuring instruments 2 and 3 constituting a three-phase wattmeter. The instrument, thus constituted, is of well known construction, being substantially the same as the instrument shown in my patent application, Serial No. 631,573, filed June 6, 1911. The instruments 2 and 3 severally comprise a stationary magnetizable core member 4 having a potential and a current winding thereon, damping magnets 5 and a rotatable armature 6. The armatures 6 are mounted on a shaft 7 that is adapted to actuate an integrating mechanism 8 and a marking device 9.

A clock mechanism 10 is mounted at one side of the instruments 2 and 3 and comprises, in general, springs 11 and 12, an escapement device 13 and a controlling device 14 hereinafter more fully set forth.

A record sheet 15 is adapted to be advanced by a roller 16 having projections 17 at the ends thereof that are adapted to register with openings 18 along the edges of the record sheet. The roller 16 is mounted on a shaft 19 upon which is also mounted two ratchet wheels 20 and 21. A sleeve 23 is loosely mounted on the shaft 19 and has secured thereto an arm 24 and a pulley wheel 25. The arm 24 is provided with a pawl 26 that is adapted to engage the ratchet wheel 20 for the purpose of advancing the record sheet 15 when the arm 24 is turned in one direction. The pulley wheel 25 is operatively connected, through a belt 27, to a pulley wheel 28 that is mounted on a shaft 29. A pinion 30, that is also mounted on the shaft 29, is adapted to engage a gear wheel 31 that constitutes a portion of the casing of the spring 11. A second sleeve 32 is mounted on the shaft 19 and has secured thereto a gear wheel 33 that is provided with a pawl 34. The pawl 34 is adapted to engage the ratchet wheel 21 for the purpose of advancing the record sheet 15 when the gear wheel 33 is turned. The gear wheel 33 engages a gear wheel 35 that constitutes a part of the casing of the spring 12. A pinion 36 is mounted on a shaft 37 which is so controlled by the controlling mechanism 14 which, in turn, is so controlled by the escapement device 13 and the spring 11, that the spring 12 is permitted to unwind a predetermined amount periodically.

The escapement device 13 oscillates, as in an ordinary clock, and, through gear wheels (not shown) permits the spring 11 to slowly unwind. The unwinding of the spring 11 causes a cam device 46 to be turned through gear wheels 47. The cam device 46 coöperates with a saddle or lever member 48 to so actuate the same that a gear wheel 49 is released every time the cam device 46 rotates a predetermined number of times. When the gear wheel 49 is periodically released by the saddle or lever member 48 the spring 12 causes the same to rotate through the gear wheel 50, pinion 51, shaft 52, gear wheel 53, pinion 54, gear wheel 55, pinion 56 and shaft 57. Thus, the spring 11 is continuously unwound and the spring 12 is periodically unwound a predetermined amount.

As the spring 11 unwinds continuously, it causes the gear wheel 31 to turn. When the gear wheel 31 is turned, it actuates, through the belt 27, the pawl 26 and the ratchet wheel 20, the record sheet 15. That is, the record sheet 15 is adapted to be moved continuously by reason of the continuous unwinding of the spring 11.

When the spring 12 is periodically unwound, its gear wheel 35 actuates the gear wheel 33 in such direction as to cause the pawl 34 to actuate the ratchet wheel 21, and, consequently, the shaft 19. Thus, periodically the shaft 19 and the record sheet 15 are advanced quickly a predetermined amount. The movement of the shaft 52 actuates a cam device 58 that is mounted thereon. The cam device coöperates with a bellcrank lever 38 which, through a series of rods 39, is adapted to so rotate a cradle 40 that the marking device 9 is disconnected from the shaft 7 to permit a counterbalance weight 41 to turn the same to its initial position. That is, certain of the train of gear wheels connected between the worm screw on the shaft 7 and the shaft upon which the pointer 9 is mounted are supported in a cradle 40 which when it is rocked or turned by reason of the movement of the rods 39 so disengages the gear wheels from the worm screw as to permit the counter balance weight 41 that is mounted on the shaft with the pointer 9 to turn the pointer relatively to the shaft 7 and thus return the same to its initial position.

When current traverses the meters 2 and 3, the marking device 9 is advanced through a gear mechanism 59, shown in Figs. 3, 4 and 5, over the record sheet 15 to record the periodic demands of power along a line 42 until such time as the controlling device 14 permits the spring 12 to unwind to advance the record sheet 15. The marking device 9 traces a line 43 upon the record sheet 15 when it is periodically advanced. After the record sheet is advanced, the cam device 58 so actuates the cradle 40 through the rods 39 as to permit the marking device 9 to be reset, along a line 44, to its initial position. After the marking device 9 has been reset to its initial position, it will again advance along a line 45 to record the periodic demand for power during the predetermined demand period.

Since the record sheet 15 is advanced continuously, the lines 44 and 45 will not be concentric or parallel with respect to each other and the flat topped portions 43 of the records produced will be widely separated with respect to each other to thus facilitate the reading of the records and preclude any overlapping of the same. This overlapping feature would be particularly detrimental if the marking device 9 were a pen because there would be a likelihood of blotting the record when the pen retraced the various lines.

I do not limit my invention to the preferred embodiment illustrated, as it may be variously modified without departing from the spirit and scope of the invention as set forth in the appended claims.

I claim as my invention:

1. In a measuring instrument, the combination with a record sheet and a marking device, of means for continuously advancing the record sheet, means for periodically disconnecting the marking device from the measuring instrument and for quickly advancing the record sheet.

2. In a recording meter, the combination with a record sheet, a marking device and a meter operatively connected to the marking device to directly actuate the same, of means for continuously advancing the record sheet, means for periodically advancing the record sheet a predetermined distance at the end of a definite interval of time, and means for disconnecting the marking device from the meter after the record sheet is periodically advanced to permit it to return to its initial position.

3. The combination with a measuring instrument, a marking device actuated directly thereby and a record sheet, of a clock mechanism for continuously advancing the record sheet, for periodically advancing the record sheet and for disconnecting the marking device from the instrument after each periodic advance of the record sheet.

4. In a recording measuring instrument, the combination with an electrical meter, a marking device actuated thereby and a record sheet, of a clock mechanism for continuously advancing the record sheet, for periodically advancing the record sheet and for controlling the periodic resetting of the marking device after each periodic advance of the record sheet.

5. In an electrical measuring instrument, the combination with an electro-responsive device, of a marking device actuated by the electro-responsive device, a record sheet, and means for continuously advancing the record sheet, for advancing the record sheet at a relatively higher rate of speed periodically and for resetting the marking device after the record sheet is periodically advanced at the relatively higher rate of speed.

6. In a measuring instrument, the combination with an electric meter, of a marking device adapted to be operatively connected to the meter, a record sheet, a spring for continuously advancing the record sheet, and a second spring controlled by the first spring for periodically advancing the record sheet and for disconnecting the marking device from the meter after the record sheet is periodically advanced.

7. In a recording measuring instrument, the combination with a marking device, and a record sheet, of a spring adapted to continuously advance the record sheet, and means controlled by the said spring for periodically advancing the record sheet and for controlling the resetting of the marking device.

8. In a measuring instrument, the combination with a marking device and a record sheet, of means for slowly advancing the record sheet, and means for periodically quickly advancing the record sheet and for controlling the resetting of the marking device.

9. In a measuring instrument, the combination with a marking device and a record sheet, of means for slowly advancing the record sheet, and means for periodically quickly advancing the record sheet and for controlling the resetting of the marking device after each periodic quick advance of the record sheet.

10. In a measuring instrument, the combination with a marking device and a record sheet, of a clock for slowly advancing the record sheet, and a spring controlled by the clock for periodically quickly advancing the record sheet and for controlling the resetting of the marking device after each periodic quick advance of the record sheet.

11. In a measuring instrument, the combination with a marking device and a record sheet, of means for continuously advancing the record sheet, periodically advancing the same and for resetting the marking device after each periodic advance of the marking device to produce a record having flat-top figures, the sides of one figure of which are eccentric to the sides of another figure.

12. In a measuring instrument, the combination with a marking device and a record sheet, of means for continuously advancing the record sheet, periodically advancing the same and for resetting the marking device to produce a record having flat-top relatively widely separated figures.

13. In a measuring instrument, the combination with a marking device and a record sheet, of means for continuously advancing the record sheet, periodically advancing the same and for resetting the marking device to produce a record having flat-top diverging figures.

In testimony whereof, I have hereunto subscribed my name this 28th day of Feb. 1917.

WILLIAM M. BRADSHAW.